June 29, 1948.　　　　L. A. VESTA　　　　2,444,387
SAFETY DEVICE FOR TRACTOR SEATS

Filed April 12, 1945　　　　　　　　　　　　3 Sheets-Sheet 1

Inventor
Lewis A. Vesta
By Caswell & Lagaard
Attorneys

June 29, 1948.  L. A. VESTA  2,444,387
SAFETY DEVICE FOR TRACTOR SEATS
Filed April 12, 1945  3 Sheets-Sheet 2
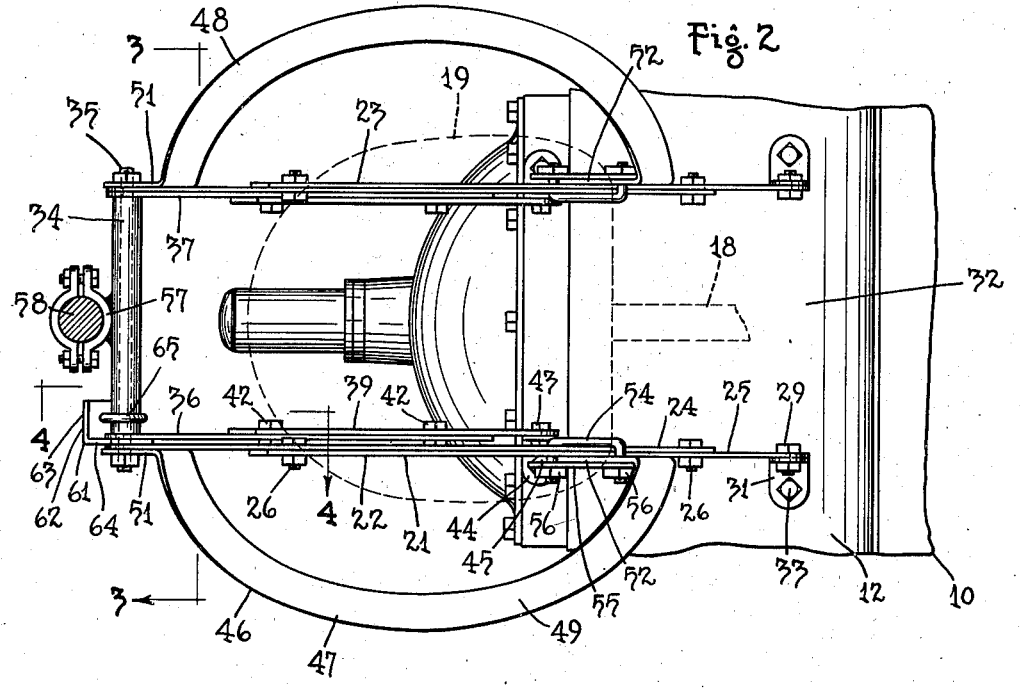
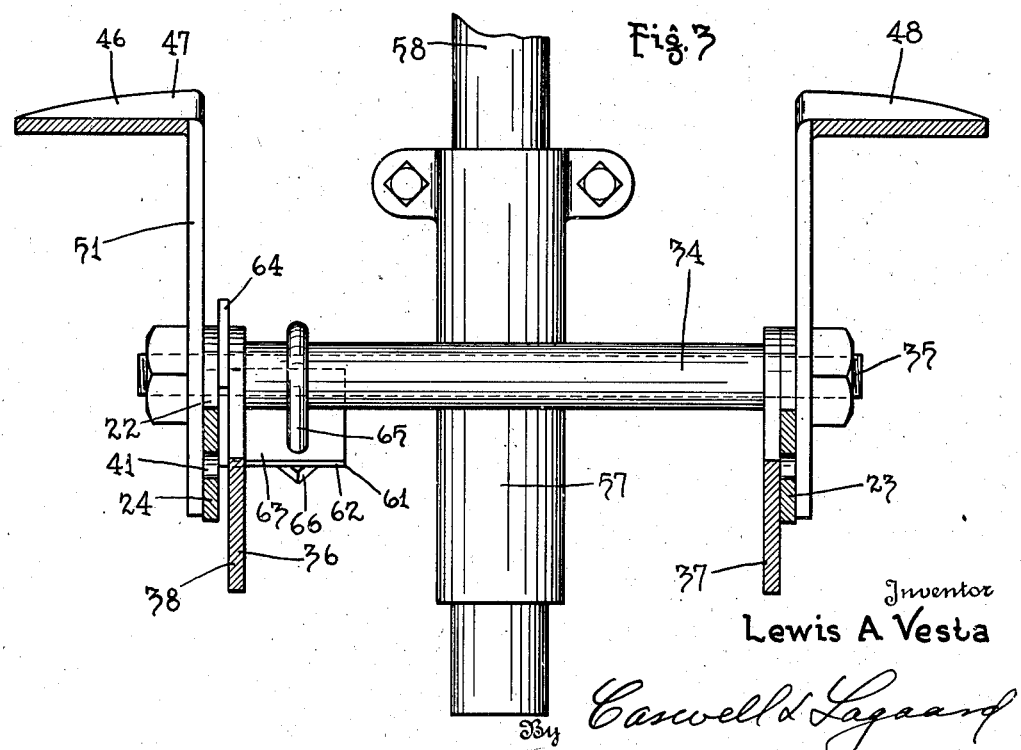
Inventor
Lewis A Vesta
By Caswell & Lagaard
Attorneys

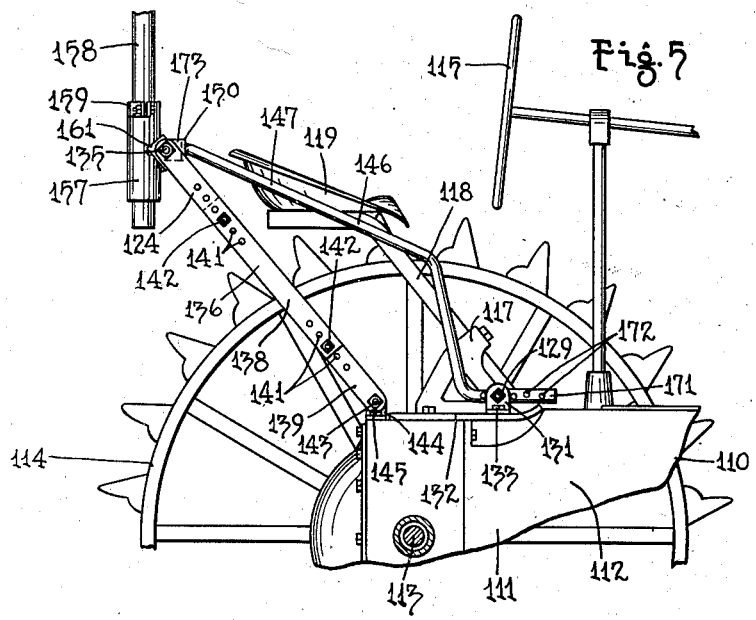
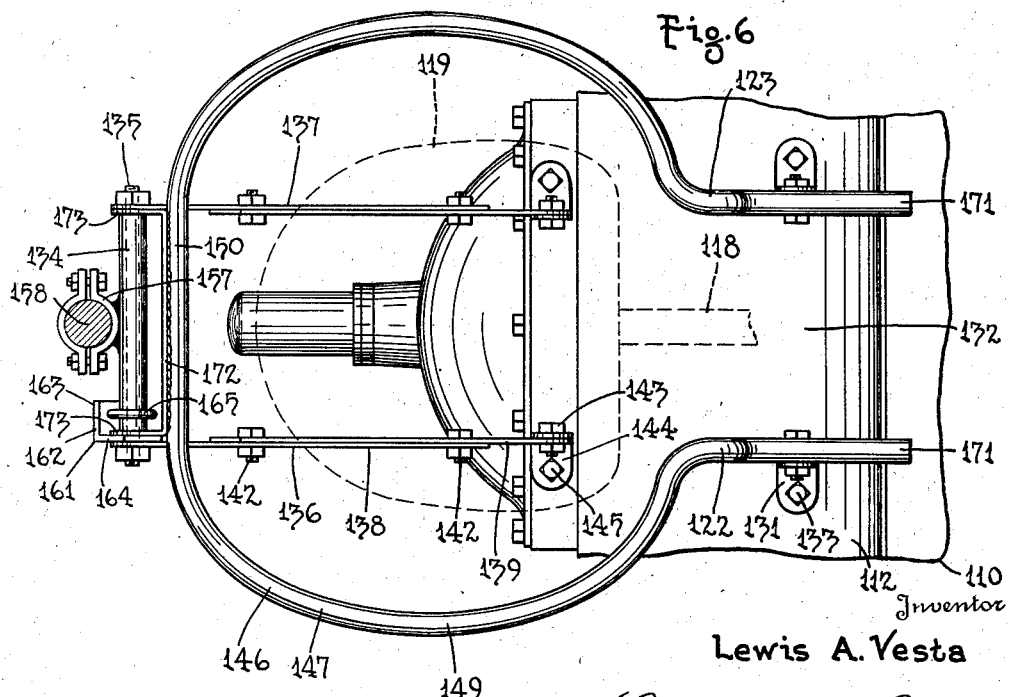

Patented June 29, 1948

2,444,387

UNITED STATES PATENT OFFICE 2,444,387

SAFETY DEVICE FOR TRACTOR SEATS

Lewis A. Vesta, Boyd, Minn.

Application April 12, 1945, Serial No. 587,919

10 Claims. (Cl. 296—63)

My invention relates to safety devices for tractor seats and has for an object to provide a safety device by means of which injury to the user of the tractor is prevented, in the event of breaking or detachment of the seat or the support therefor.

An object of the invention resides in constructing the device with a guard having portions disposed substantially at the elevation of the seat and spaced therefrom to permit of free movement of the seat.

Another object of the invention resides in constructing the guard with portions disposed adjacent the sides of the seat.

Another object of the invention resides in constructing the device with a frame attached to the chassis of the tractor and extending upwardly and rearwardly therefrom and in further providing one or more braces attached to the frame at its upper portion and also to the chassis at a locality rearwardly of the frame.

A still further object of the invention resides in forming the guard integral with the frame or as a separate structure adjustable relative to the frame.

An object of the invention resides in constructing the braces and/or frame with extensible members to permit adjusting the guard with reference to the seat.

Another object of the invention resides in constructing the frame with a cross-bar and in attaching to the cross-bar an umbrella support.

A feature of the invention resides in rotatably supporting the umbrella support relative to the frame for movement about a horizontal axis, so that the support may tilt in the event that the umbrella strikes an object whereby injury to the umbrella is prevented.

Other objects of the invention reside in the novel combination and arrangement of parts and in the details of construction hereinafter illustrated and/or described.

In the drawings:

Fig. 2 is a plan view of the structure shown in Fig. 1.

Fig. 3 is an elevational sectional view taken on line 3—3 of Fig. 2 and drawn to a larger scale.

Fig. 5 is an elevational sectional view similar to Fig. 1 illustrating a modification of the invention.

Fig. 6 is a view similar to Fig. 2 of the structure shown in Fig. 5.

In the operation of tractors, considerable danger to the operator is present in the event that the seat support or seat becomes broken or detached from the tractor. Occasions have arisen where the operator has fallen into a mower or other apparatus drawn by the tractor. The instant invention provides a construction whereby the operator is supported even if the seat gives way, so that the hazard to the operator is greatly reduced. At the same time, the device functions to support an umbrella for shielding the operator while using the tractor.

Figure 1:
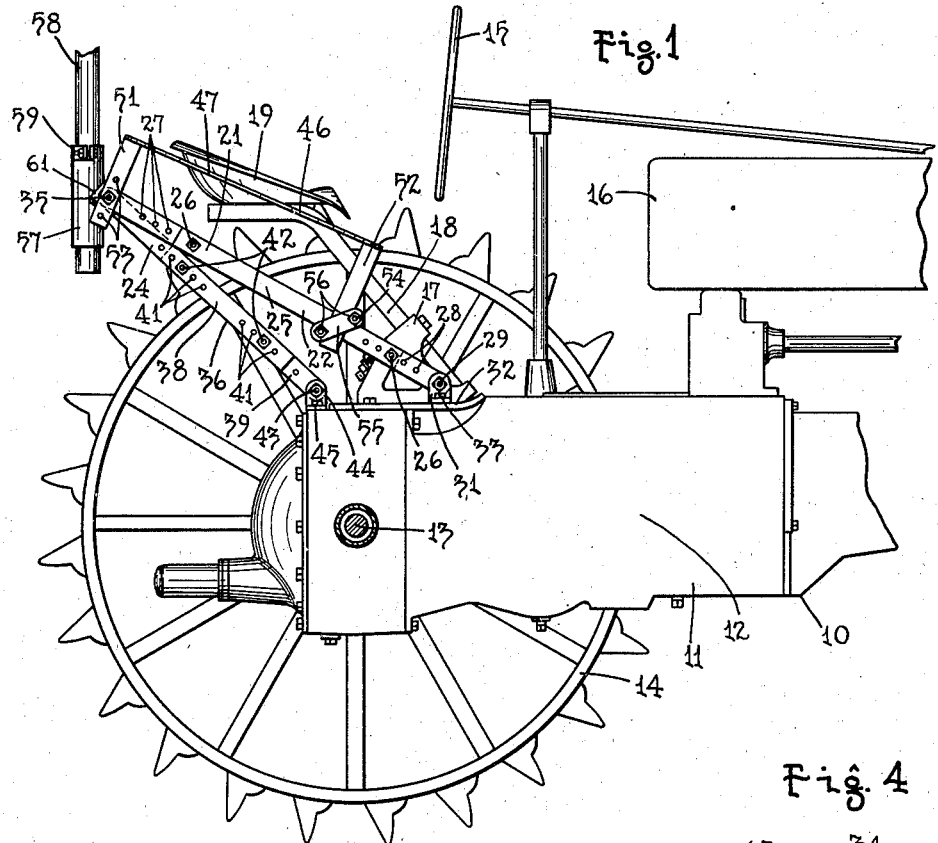
Fig. 1 is a longitudinal elevational sectional view of a tractor illustrating an embodiment of my invention applied thereto.
Figure 4:
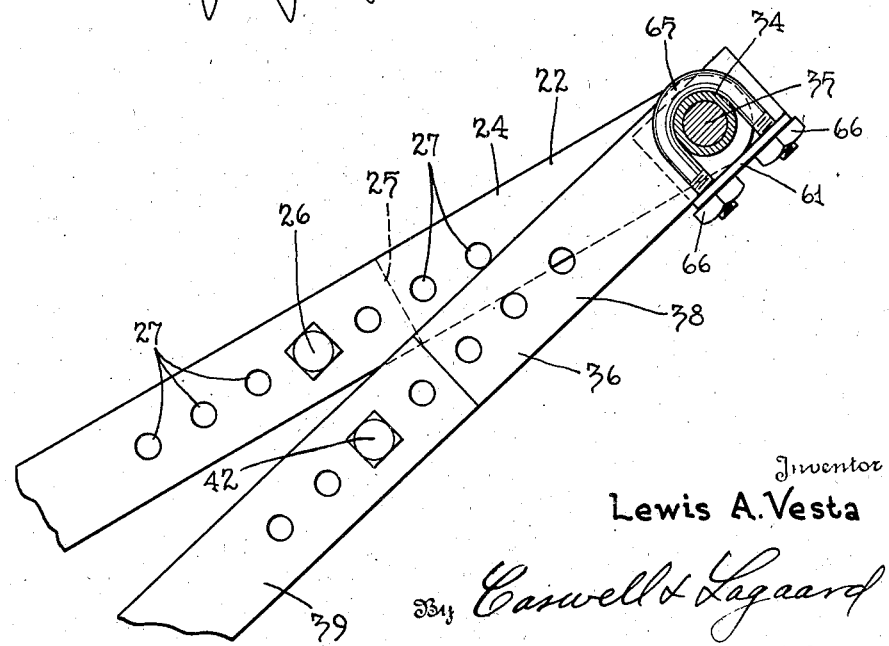
Fig. 4 is an elevational sectional view taken on line 4—4 of Fig. 2 and drawn to a larger scale.

For the purpose of illustrating my invention, I have shown in Figs. 1 and 2, a tractor 10 which comprises a chassis 11 having a housing 12 in which the machinery and other operating portions of the tractor are disposed. The rear axle 13 is carried by the housing 12 and has attached to it tractor wheels 14 whereby the rearward portion of the tractor is supported. The tractor 10 includes a steering wheel 15, a gasoline tank 16 and all of the other parts which are usually employed with tractors. Due to the fact that the specific construction of the tractor does not form any particular feature of the invention, the tractor has been only partly illustrated, and only so much thereof has been shown as is necessary to illustrate the application of my invention thereto.

Attached to the rearward portion of the housing 12 of tractor 10 is a casting 17 which has attached to it an upwardly and rearwardly extending support 18. This support has secured to it a seat 19 of conventional construction. In the instant invention, the support 18 is pivoted to the casting 17 and a spring within said casting, not visible in the drawing, engages the support, thus cushioning the seat and holds the seat in proper position. In other forms of the tractor, the support for the seat is made of spring material and the same effect is secured.

The instant invention consists of a frame structure 21 comprising two lateral frame members 22 and 23. These frame members are identical in construction and only the frame member 22 will be described in detail. This frame member consists of two sections 24 and 25 which overlie one another and are bolted together by means of bolts 26. The bolts 26 are adapted to pass through different holes 27 and 28 in the sections 24 and 25, whereby the frame members 22 and 23 may be extended or contracted to adjust the same for a purpose to be presently described.

The frame member 25 is pivotally connected by means of a bolt 29 with a bracket 31 which overlies the top portion 32 of the housing 12 situated directly above the axle and which is secured thereto by means of a bolt 33. The two frame members 22 and 23 are spaced from one another and are connected together at the upper ends by means of a tubular cross-bar 34 and a bolt 35 which extends through the upper ends of the frame section 24 of both of said members 22 and 23 and the bar 34.

For further supporting the frame structure 21, two braces 36 and 37 are employed. These braces are identical in construction and only the brace 36 will be described in detail. This brace consists of two sections 38 and 39 formed with adjustment holes 41 and bolted together by means of bolts 42. The sections 39 are secured by means of bolts 43 to brackets 44 which, in turn, are bolted to the upper portion 32 of the housing 12 by means of bolts 45. The upper ends of the members 38 of these braces are held in proper position by the cross-frame member 34 and the bolt 35 which extends through these braces. It will thus be seen that a rigid frame structure is provided which is supported from the tractor housing 12 independently of the seat 19 or the supporting structure therefor. It will readily be comprehended that the frame structure and braces may be adjusted to fit various tractors and to bring the frame at the proper elevation and position with respect to the seat of the tractor. It will also become apparent that by means of the adjustments provided that the frame structure may be attached to the tractor by means of existing bolts or cap screws on the tractor chassis so as to obviate the necessity of drilling and tapping the tractor housing.

In conjunction with the frame structure 21, I employ a guard 46 consisting of two guard members 47 and 48. Both of the guard members being identical in construction, only the guard member 47 will be described in detail. This guard member consists of an arcuate portion 49 which encircles the seat 10 on one side thereof and which is situated at substantially the same elevation as the seat and which is spaced from the seat. The guard member 47 has two depending legs 51 and 52 which overlie the frame member 22. The leg 51 has a number of holes 53 in it through which the bolt 35 may extend, whereby the upper end of the said guard member may be adjustably supported with reference to the cross-bar 34. The lower leg 52 overlies the frame section 25 and is adjustably attached thereto by means of a U bolt 54 which straddles both the frame member 22 and the said leg. This U bolt passes through a plate 55 and when the nuts 56 of said U bolt are drawn against the plate 55, said U bolt clamps the leg 52 relative to the member 22, thereby holding the lower end of the guard in adjusted position. It will be noted that the two guard members 48 and 49 form a guard which encircles the seat 19 at the sides thereof and along a portion of the rear of said seat.

Welded to the tubular cross-frame member 34 is a tubular holder 57 for the shaft 58 of an umbrella not shown in the drawings. This holder is provided with a clamp 59 by means of which the umbrella shaft may be rigidly held in the holder.

It will be noted that the housing 34 is rotatably mounted on the bolt 35 and that the umbrella may swing in a forward and rearward direction on this bolt as an axis. To hold the holder 57 in adjusted position, a friction device 61, best shown in Figs. 2 and 3, is employed. This friction device consists of a clip angle 62 having legs 63 and 64. The leg 64 is drilled to receive the bolt 35 and is disposed between the section 24 of frame member 22 and the section 38 of brace 36. The leg 63 of this angle engages the lower edge of the brace section 38 and is held from rotation thereby. Encircling the cross-bar 34 is a U bolt 65 which extends through the leg 63 and has nuts 66 screwed on the end of it by means of which the same may be tightened to afford frictional engagement with the cross-bar 34. It will thus readily become apparent that suitable friction may be exerted upon the cross-bar 34 to hold the umbrella holder in proper position.

The operation of the invention is as follows: The device is preferably attached to the tractor by the use of existing bolts or cap screws thereon and the frame adjusted to position the same with proper relation to the seat of the tractor. The guards are then applied and adjusted to a position slightly below the elevation of the seat, so that the guards are out of the way when the operator mounts the tractor, and seats himself upon the seat. The umbrella holder is next adjusted to its proper position, and the device is ready for use. In mounting the tractor, the operator uses the guard as a hand grip for assisting in raising himself to the seat. After being seated on the seat, the operator manipulates the tractor as if the device were absent. Should, however, the tractor seat or support become disengaged or broken, the operator would drop within the guard and would be prevented from falling upon the ground rearwardly of the tractor. In the event that the umbrella struck an obstacle while the tractor was being propelled in a forward or rearward direction, the friction device 61 would yield, so as to prevent injury to the umbrella.

In Figs. 5 and 6, I have shown a modification of the invention. Due to the similarity of the parts, the description of the similar parts will not be repeated and the same reference numerals, preceded by the digit 1 will be used to designate corresponding parts. In this form of the invention, the two side frame members 122 and 123 are made integral with the guard members 147 and 148. Also, these guard members are integrally connected by a rearward portion 150. To permit of longitudinal adjustment of the frame members 122 and 123, the lower portions 171 of these frame members are constructed with holes 172 through which the bolts 129 extend. Welded to the portion 159 of the guard 146 is a channel-shaped support 172 having ears 173 extending outwardly therefrom. These ears are drilled to receive the bolt 135 and support the cross-bar 134. The brace members 136 and 137 also are held attached to these ears through the bolt 135. With this form of the invention, the guard may be constructed tubular in form and bent into the desired shape.

The method of attachment and the manner of using the form of the invention shown in Figs. 5 and 6 is identical with that shown in Figs. 1-4.

While I have shown the device applied to a particular tractor, it can readily be comprehended that the device can be applied to different types of tractors and that different types of fastening means for securing the lower ends of the frame structure and braces to the tractor may be employed.

The advantages of my invention are manifest. Safety is provided for the operator, preventing injury to the operator in the event of breakage or detachment of the seat or seat support. The device can be applied to existing tractors without appreciable alteration or reconstruction thereof. The device provides an effective umbrella support and is so constructed that accidental engagement of the umbrella with a stationary structure does not injure or break the umbrella. The guard serves as a handle grip for the operator in mounting the tractor. My invention is simple and effective in construction and will not readily get out of order. The device is supported independently of the seat, so that breakage or disengagement of any portion of the seat or supporting structure therefor will not affect the operation of the device.

Changes in the specific form of my invention as herein disclosed may be made within the scope of what is claimed without departing from the spirit of my invention.

Having described my invention, what I claim as new and desire to protect by Letters Patent is:

1. In combination with a tractor having a chassis and a seat disposed above the same, a seat support for supporting said seat for vertical movement relative to said chassis, a pair of spaced frame members secured to said chassis and extending upwardly and rearwardly therefrom, a pair of braces secured to said frame member at their upper ends and to the chassis at a locality rearwardly of the locality of attachment of the frame members thereto and a guard at the upper portions of said frame members and spaced from and free from said seat to accommodate vertical movement of said seat, said frame members and braces being extensible to adjust the position of said guard relative to the seat said guard being disposed substantially at the elevation of the seat and forming a support for the occupant in the event of failure of the seat support.

2. In combination with a tractor having a chassis and a seat disposed above the same, a seat support for supporting said seat for vertical movement relative to said chassis, a pair of spaced frame members secured to said chassis and extending upwardly and rearwardly therefrom, a pair of braces secured to said frame member at their upper ends and to the chassis at a locality rearwardly of the locality of attachment of the frame members thereto and a guard at the upper portions of said frame member spaced from and free from said seat to accommodate vertical movement of said seat, said braces being extensible to adjust the position of said guard relative to the seat said guard being disposed substantially at the elevation of the seat and forming a support for the occupant in the event of failure of the seat support.

3. In combination with a tractor having a chassis and a seat disposed above the same, a seat support for supporting said seat for vertical movement to said chassis, a pair of spaced frame members secured to said chassis and extending upwardly and rearwardly therefrom, a pair of braces secured to said frame members at their upper ends and to the chassis at a locality rearwardly of the locality of attachment of the frame members thereto, a pair of guard members, one on each side of said frame and spaced therefrom, said guard members having legs depending therefrom and disposed adjacent said frame members and means for adjustably attaching said legs to said frame members to vary the position of the guards with reference to the seat said guard being disposed substantially at the elevation of the seat and forming a support for the occupant in the event of failure of the seat support.

4. In combination with a tractor having a chassis and a seat extending upwardly therefrom, a pair of spaced frame members secured to said chassis and extending upwardly and rearwardly therefrom, a pair of braces secured to said frame members at their upper ends and to the chassis at a locality rearwardly of the locality of attachment of the frame members thereto, a cross-frame bar disposed between the upper ends of said frame members and an umbrella holder secured to said cross-bar and including a socket for the reception of the shaft of an umbrella, said socket opening upwardly and being positioned so that an umbrella may be supported thereby in a manner to shade the occupant on said seat.

5. In combination with a tractor having a chassis and a seat disposed above the same, a pair of spaced frame members secured to said chassis and extending upwardly and rearwardly therefrom, a pair of braces secured to said frame members at their upper ends and to the chassis at a locality rearwardly of the locality of attachment of the frame members thereto, a cross-bar extending between the upper ends of said frame members, means for pivotally supporting said cross-bar for swinging movement about a transverse horizontal axis, an umbrella holder attached to said cross-bar and including a socket for the reception of the shaft of an umbrella, said socket opening upwardly and being positioned so that an umbrella may be supported thereby in a manner to shade the occupant on said seat, said cross-bar, upon excess force applied to the umbrella, yielding to prevent breakage of the umbrella.

6. In combination with a tractor having a chassis and a seat disposed above the same, means for yieldingly supporting said seat for vertical movement including an upwardly extending bar connected to the seat and chassis, a frame structure attached to said chassis independently of the seat and extending rearwardly and upwardly therefrom and a guard elongated in form, supported by said frame structure and encircling said seat, said guard being disposed substantially at the same elevation as said seat, said guard and frame structure being spaced from said seat and bar to accommodate vertical movement of said seat.

7. In combination with a tractor having a chassis and a seat disposed above the same, means for yieldingly supporting said seat for vertical movement including an upwardly extending bar connected to the seat and chassis, a frame structure attached to said chassis independently of the seat, a guard carried by said frame structure and including arcuate side members encircling said seat on the sides thereof, means for connecting the said ends of said guards to said frame structure and connecting means for the rearward portions of said guards, said connecting means being attached to said frame structure, said guard and frame structure being spaced from said seat and bar to accommodate vertical movement of said seat.

8. In combination with a tractor having a chassis and a seat disposed above the same, means for yieldingly supporting said seat for vertical movement including an upwardly extending bar connected to the seat and chassis; a U-shaped guard encircling said seat and disposed substantially at the elevation thereof, legs formed on the end of said guard and extending down to said chassis, means for attaching said legs to said chassis and a brace connected to said chassis and connected to said guard at the rearward portion thereof, said guard, legs and brace being free from said seat to accommodate vertical movement of said seat.

9. In combination with a tractor having a chassis and a seat disposed above the same, means for yieldingly supporting said seat for vertical movement including an upwardly extending bar connected to the seat and chassis; a guard including two arcuate side members encircling said seat, ears extending outwardly from said guard and spaced from one another, a brace disposed adjacent one of said ears and extending downwardly to said chassis, a cross-bar disposed between said ears, a bolt extending through said cross-bar ears and brace for clamping the same together to provide friction therebetween and an umbrella holder secured to said cross-bar and supporting the shaft of an umbrella in a position such that the umbrella shades the occupant on said seat and means for attaching the forward ends of said guard to said chassis.

10. In combination with a tractor having a chassis and a seat disposed above the same, means for yieldingly supporting said seat for vertical movement including an upwardly extending bar connected to the seat and chassis, a guard constructed from a rod bent to form a loop encircling said seat and arranged at substantially the same angle and elevation as said seat, said loop having arcuate side members disposed at the sides of the seat and a connecting portion therefor at the rear of the seat, a brace connected to said connecting portion and to the chassis, legs bent downwardly from the ends of the loop and means for attaching the ends of said legs to said chassis.

LEWIS A. VESTA.

REFERENCES CITED

The following references are of record in the file of this patent:

UNITED STATES PATENTS

| Number | Name | Date |
|---|---|---|
| D. 142,251 | Brown et al. | Aug. 21, 1945 |
| 638,331 | Grant | Dec. 5, 1899 |
| 988,814 | Reid | Apr. 4, 1911 |
| 1,093,042 | Etherington | April 14, 1914 |
| 1,305,771 | Clark | June 3, 1919 |
| 1,360,407 | Hughes et al. | Nov. 30, 1920 |
| 1,433,720 | Hendrickson | Oct. 31, 1922 |
| 1,491,306 | Kirkham | Apr. 22, 1924 |
| 2,254,358 | Frudden et al. | Sept. 2, 1941 |
| 2,263,978 | Branovic et al. | Nov. 25, 1941 |